(12) United States Patent
Kim et al.

(10) Patent No.: US 9,960,893 B2
(45) Date of Patent: May 1, 2018

(54) METHOD FOR CHANGING PATTERN OF REFERENCE SIGNALS ACCORDING TO RANK VARIATION IN WIRELESS COMMUNICATION SYSTEM, AND AN APPARATUS THEREFOR

(71) Applicant: LG ELECTRONICS INC., Seoul (KR)

(72) Inventors: Kitae Kim, Anyang-si (KR); Jinmin Kim, Anyang-si (KR); Hyunsoo Ko, Anyang-si (KR); Jaehoon Chung, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 170 days.

(21) Appl. No.: 14/649,437

(22) PCT Filed: Oct. 10, 2013

(86) PCT No.: PCT/KR2013/009044
§ 371 (c)(1),
(2) Date: Jun. 3, 2015

(87) PCT Pub. No.: WO2014/088196
PCT Pub. Date: Jun. 12, 2014

(65) Prior Publication Data
US 2015/0304083 A1    Oct. 22, 2015

Related U.S. Application Data

(60) Provisional application No. 61/733,380, filed on Dec. 4, 2012.

(51) Int. Cl.
*H04W 74/00*    (2009.01)
*H04L 5/00*    (2006.01)
*H04L 27/18*    (2006.01)
*H04L 27/26*    (2006.01)

(52) U.S. Cl.
CPC .......... *H04L 5/0048* (2013.01); *H04L 5/0025* (2013.01); *H04L 5/0051* (2013.01);
(Continued)

(58) Field of Classification Search
None
See application file for complete search history.

(56) References Cited

U.S. PATENT DOCUMENTS

2006/0209732 A1    9/2006  Gorokhov et al.
2007/0195908 A1*   8/2007  Attar .................... H04B 7/0452
                                                        375/267
(Continued)

FOREIGN PATENT DOCUMENTS

WO    WO 2007/098450 A2    8/2007
WO    WO 2007/098457 A1    8/2007
(Continued)

OTHER PUBLICATIONS

CMCC, "DMRS indication in DL enhanced Multiple antenna transmission," 3GPP TSG-RAN WG1 #62, R1-104725, Madrid, Spain, Aug. 23-27, 2010, 6 pages.
(Continued)

*Primary Examiner* — Hassan Phillips
*Assistant Examiner* — Gautam Sharma
(74) *Attorney, Agent, or Firm* — Birch, Stewart, Kolasch & Birch, LLP

(57) ABSTRACT

A method for transmitting a reference signal to a user equipment at a base station in a wireless communication system is disclosed. The method includes transmitting the reference signal to the user equipment according to a first pattern corresponding to a first rank and, if a rank is changed from the first rank to a second rank, transmitting the reference signal to the user equipment according to a second pattern corresponding to the second rank, wherein, if the
(Continued)

second rank is greater than the first rank, the second pattern includes the first pattern. Preferably, the first pattern is a reference signal pattern for a single rank and the second pattern is defined as a hierarchical structure in which one or more reference signal symbols are added to the first pattern in a time domain direction.

14 Claims, 16 Drawing Sheets

(52) U.S. Cl.
CPC ........... *H04W 74/004* (2013.01); *H04L 27/18* (2013.01); *H04L 27/2601* (2013.01)

(56) References Cited

U.S. PATENT DOCUMENTS

| | | | |
|---|---|---|---|
| 2010/0080154 A1* | 4/2010 | Noh | H04B 7/0452 370/310 |
| 2010/0195748 A1* | 8/2010 | Nam | H04J 11/0069 375/260 |
| 2011/0159882 A1* | 6/2011 | Ho | H04L 5/0007 455/450 |
| 2012/0188877 A1 | 7/2012 | Chin et al. | |
| 2012/0201163 A1 | 8/2012 | Jöngren et al. | |
| 2012/0201164 A1 | 8/2012 | Jöngren et al. | |
| 2012/0230290 A1 | 9/2012 | Seo et al. | |

FOREIGN PATENT DOCUMENTS

| | | |
|---|---|---|
| WO | WO 2011/085510 A1 | 7/2011 |
| WO | WO 2011/088589 A1 | 7/2011 |

OTHER PUBLICATIONS

New Postcom, "A subset-CRS based tracking RS for unsynchronized new carrier type," 3GPP TSG RAN WG1 Meeting #71, R1-124945, New Orleans, LA, USA, Nov. 12-16, 2012, pp. 1-9.

Qualcomm Incorporated, "Transmission modes for NCT," 3GPP TSG-RAN WG1 #71, R1-125116, New Orleans, LA, USA, Nov. 12-16, 2012, 11 pages.

* cited by examiner (a) Control-plane protocol stack (b) User-plane protocol stack (a)

(b)

▨ : DM-RS Group 1

▩ : DM-RS Group 2

METHOD FOR CHANGING PATTERN OF REFERENCE SIGNALS ACCORDING TO RANK VARIATION IN WIRELESS COMMUNICATION SYSTEM, AND AN APPARATUS THEREFOR

CROSS REFERENCE TO RELATED APPLICATIONS

This application is the National Phase of PCT International Application No. PCT/KR2013/009044, filed on Oct. 10, 2013, which claims priority under 35 U.S.C. 119(e) to U.S. Provisional Application No. 61/733,380, filed on Dec. 4, 2012, all of which are hereby expressly incorporated by reference into the present application.

TECHNICAL FIELD

The present invention relates to a wireless communication system, and more particularly, to a method for changing a pattern of reference signals according to rank variation in a wireless communication system, and an apparatus therefor.

BACKGROUND ART

As an example of a mobile communication system to which the present invention is applicable, a 3rd Generation Partnership Project Long Term Evolution (hereinafter, referred to as LTE) communication system is described in brief.

FIG. 1 is a view schematically illustrating a network structure of an E-UMTS as an exemplary radio communication system. An Evolved Universal Mobile Telecommunications System (E-UMTS) is an advanced version of a conventional Universal Mobile Telecommunications System (UMTS) and basic standardization thereof is currently underway in the 3GPP. E-UMTS may be generally referred to as a Long Term Evolution (LTE) system. For details of the technical specifications of the UMTS and E-UMTS, reference can be made to Release 7 and Release 8 of "3rd Generation Partnership Project; Technical Specification Group Radio Access Network".

Referring to FIG. 1, the E-UMTS includes a User Equipment (UE), eNode Bs (eNBs), and an Access Gateway (AG) which is located at an end of the network (E-UTRAN) and connected to an external network. The eNBs may simultaneously transmit multiple data streams for a broadcast service, a multicast service, and/or a unicast service.

One or more cells are present per eNB. A cell is configured to use one of bandwidths of 1.44, 3, 5, 10, 15, and 20 MHz to provide a downlink or uplink transport service to several UEs. Different cells may be set to provide different bandwidths. The eNB controls data transmission and reception for a plurality of UEs. The eNB transmits downlink scheduling information with respect to downlink data to notify a corresponding UE of a time/frequency domain in which data is to be transmitted, coding, data size, and Hybrid Automatic Repeat and reQuest (HARQ)-related information. In addition, the eNB transmits uplink scheduling information with respect to uplink data to a corresponding UE to inform the UE of an available time/frequency domain, coding, data size, and HARQ-related information. An interface may be used to transmit user traffic or control traffic between eNBs. A Core Network (CN) may include the AG, a network node for user registration of the UE, and the like. The AG manages mobility of a UE on a Tracking Area (TA) basis, each TA including a plurality of cells.

Although radio communication technology has been developed up to LTE based on Wideband Code Division Multiple Access (WCDMA), demands and expectations of users and providers continue to increase. In addition, since other radio access technologies continue to be developed, new advances in technology are required to secure future competitiveness. For example, decrease of cost per bit, increase of service availability, flexible use of a frequency band, simple structure, open interface, and suitable power consumption by a UE are required.

DISCLOSURE

Technical Problem

Based on the above discussion, the present invention proposes a method for changing a pattern of reference signals according to rank variation in a wireless communication system, and an apparatus therefor.

Technical Solution

In accordance with an embodiment of the present invention, a method for transmitting a reference signal to a user equipment at a base station in a wireless communication system includes transmitting the reference signal to the user equipment according to a first pattern corresponding to a first rank, and if a rank is changed from the first rank to a second rank, transmitting the reference signal to the user equipment according to a second pattern corresponding to the second rank, wherein, if the second rank is greater than the first rank, the second pattern includes the first pattern.

The method may further include receiving information about a rank of a channel between the user equipment and the base station from the user equipment. When the rank is changed from the first rank to the second rank, the method may further include receiving information about the second pattern from the user equipment. The method may further include receiving an uplink sounding reference signal from the user equipment and estimating a rank of a downlink channel between the base station and the user equipment based on the uplink sounding reference signal.

In accordance with an embodiment of the present invention, a base station in a wireless communication system includes a radio communication module for transmitting and receiving signals to and from a user equipment and a processor for processing the signals, wherein, while transmitting a reference signal to the user equipment according to a first pattern corresponding to a first rank, if a rank is changed to a second rank from the first rank, the processor controls the radio communication module to transmit the reference signal to the user equipment according to a second pattern corresponding to the second rank, and wherein, if the second rank is greater than the first rank, the second pattern includes the first pattern.

In accordance with another embodiment of the present invention, a method for receiving a reference signal from a base station at a user equipment in a wireless communication system includes receiving the reference signal from the base station according to a first pattern corresponding to a first rank and, if a rank is changed from the first rank to a second rank, receiving the reference signal from the base station according to a second pattern corresponding to the second rank, wherein, if the second rank is greater than the first rank, the second pattern includes the first pattern.

In accordance with another embodiment of the present invention, a user equipment in a wireless communication system includes a radio communication module for transmitting and receiving signals to and from a base station and a processor for processing the signals, wherein, while receiving a reference signal from the base station according to a first pattern corresponding to a first rank, if a rank is changed to a second rank from the first rank, the processor controls the radio communication module to receive the reference signal from the base station according to a second pattern corresponding to the second rank, and wherein, if the second rank is greater than the first rank, the second pattern includes the first pattern.

In the above embodiments, the first pattern may be a reference signal pattern for a single rank and the second pattern may be defined as a hierarchical structure in which one or more reference signal symbols are added to the first pattern in a time domain direction. Time-domain reference signal density of the second pattern may be higher than time-domain reference signal density of the first pattern.

Advantageous Effects

According to the embodiments of the present invention, a base station can more efficiently transmit a reference signal for a small cell by varying a reference signal pattern according to rank variation in a wireless communication system.

It will be appreciated by persons skilled in the art that that the effects that can be achieved through the present invention are not limited to what has been particularly described hereinabove and other advantages of the present invention will be more clearly understood from the following detailed description.

BEST MODE

Hereinafter, structures, operations, and other features of the present invention will be readily understood from the embodiments of the present invention, examples of which are illustrated in the accompanying drawings. Embodiments described later are examples in which technical features of the present invention are applied to a 3GPP system.

Although the embodiments of the present invention will be described based on an LTE system and an LTE-Advanced (LTE-A) system, the LTE system and the LTE-A system are only exemplary and the embodiments of the present invention can be applied to all communication systems in accordance with the aforementioned definition. In addition, although the embodiments of the present invention will be described based on FDD mode, the FDD mode is only exemplary and the embodiments of the present invention can easily be applied to H-FDD mode or TDD mode.

Figure 1:
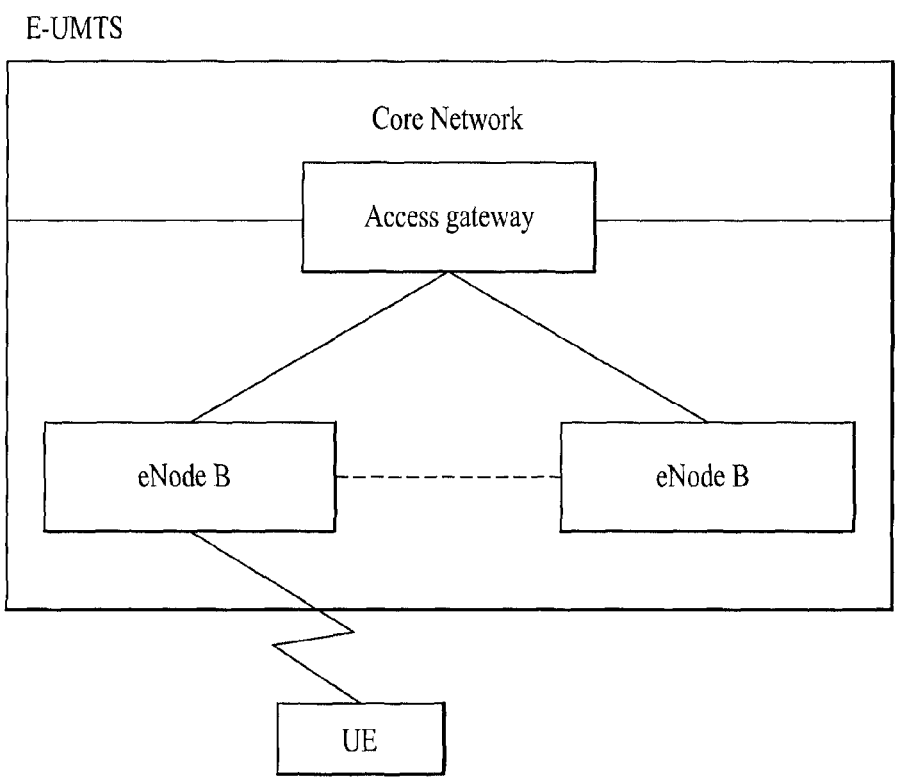
FIG. 1 is a view schematically illustrating a network structure of an E-UMTS as an exemplary radio communication system.
Figure 2:
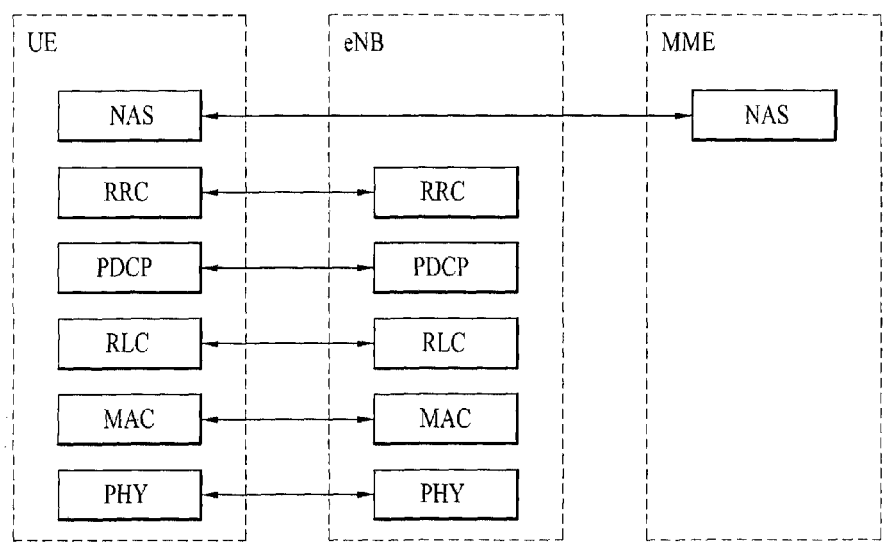
FIG. 2 is a view illustrating structures of a control plane and a user plane of a radio interface protocol between a UE and an E-UTRAN based on the 3GPP radio access network specification.
Figure 2:
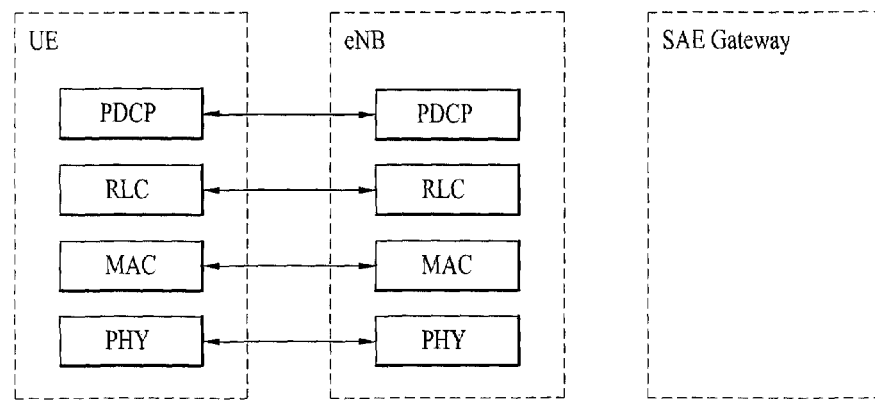

FIG. 2 is a view illustrating structures of a control plane and a user plane of a radio interface protocol between a UE and an E-UTRAN based on the 3GPP radio access network specification. The control plane refers to a path used for transmission of control messages, which are used by a UE and a network to manage a call. The user plane refers to a path used for transmitting data generated in an application layer, e.g., voice data or Internet packet data.

A physical layer of a first layer provides an information transfer service to an upper layer using a physical channel. The physical layer is connected to a Medium Access Control (MAC) layer of an upper layer via a transport channel. Data is transported between the MAC layer and the physical layer via the transport channel. Data is also transported between a physical layer of a transmitting side and a physical layer of a receiving side via a physical channel. The physical channel uses time and frequency as radio resources. Specifically, the physical channel is modulated using an Orthogonal Frequency Division Multiple Access (OFDMA) scheme in downlink and is modulated using a Single-Carrier Frequency Division Multiple Access (SC-FDMA) scheme in uplink.

A Medium Access Control (MAC) layer of a second layer provides a service to a Radio Link Control (RLC) layer of an upper layer via a logical channel. The RLC layer of the second layer supports reliable data transmission. The function of the RLC layer may be implemented by a functional block within the MAC. A Packet Data Convergence Protocol (PDCP) layer of the second layer performs a header compression function to reduce unnecessary control information for efficient transmission of an Internet Protocol (IP) packet such as an IPv4 or IPv6 packet in a radio interface having a relatively narrow bandwidth.

A Radio Resource Control (RRC) layer located at the bottommost portion of a third layer is defined only in the control plane. The RRC layer controls logical channels, transport channels, and physical channels in relation to configuration, reconfiguration, and release of radio bearers. Radio bearer refers to a service provided by the second layer to transmit data between the UE and the network. To this end, the RRC layer of the UE and the RRC layer of the network exchange RRC messages. The UE is in an RRC connected mode if an RRC connection has been established between the RRC layer of the radio network and the RRC layer of the UE. Otherwise, the UE is in an RRC idle mode. A Non-Access Stratum (NAS) layer located at an upper level of the RRC layer performs functions such as session management and mobility management.

One cell of the eNB is set to use one of bandwidths such as 1.4, 3, 5, 10, 15, and 20 MHz to provide a downlink or uplink transmission service to UEs. Different cells may be set to provide different bandwidths.

Downlink transport channels for data transmission from the network to the UE include a Broadcast Channel (BCH) for transmitting system information, a Paging Channel (PCH) for transmitting paging messages, and a downlink Shared Channel (SCH) for transmitting user traffic or control messages. Traffic or control messages of a downlink multicast or broadcast service may be transmitted through the downlink SCH or may be transmitted through an additional downlink Multicast Channel (MCH). Meanwhile, uplink transport channels for data transmission from the UE to the network include a Random Access Channel (RACH) for transmitting initial control messages and an uplink SCH for transmitting user traffic or control messages. Logical channels, which are located at an upper level of the transport channels and are mapped to the transport channels, include a Broadcast Control Channel (BCCH), a Paging Control Channel (PCCH), a Common Control Channel (CCCH), a Multicast Control Channel (MCCH), and a Multicast Traffic Channel (MTCH).

Figure 3:
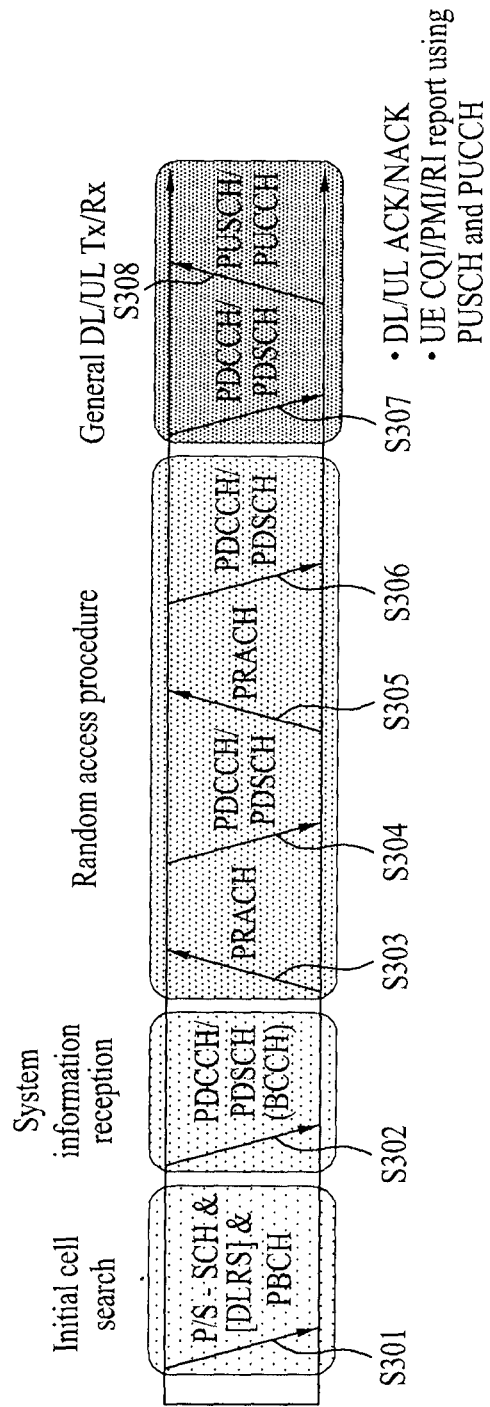
FIG. 3 is a view illustrating physical channels used in a 3GPP system and a general signal transmission method using the same.

FIG. 3 is a view illustrating physical channels used in a 3GPP system and a general signal transmission method using the same.

A UE performs initial cell search such as establishment of synchronization with an eNB when power is turned on or the UE enters a new cell (step S301). The UE may receive a Primary Synchronization Channel (P-SCH) and a Secondary Synchronization Channel (S-SCH) from the eNB, establish synchronization with the eNB, and acquire information such as a cell identity (ID). Thereafter, the UE may receive a physical broadcast channel from the eNB to acquire broadcast information within the cell. Meanwhile, the UE may receive a Downlink Reference Signal (DL RS) in the initial cell search step to confirm a downlink channel state.

Upon completion of the initial cell search, the UE may receive a Physical Downlink Control Channel (PDCCH) and a Physical Downlink Shared Channel (PDSCH) according to information included in the PDCCH to acquire more detailed system information (step S302).

Meanwhile, if the UE initially accesses the eNB or if radio resources for signal transmission are not present, the UE may perform a random access procedure (steps S303 to S306) with respect to the eNB. To this end, the UE may transmit a specific sequence through a Physical Random Access Channel (PRACH) as a preamble (steps S303 and S305), and receive a response message to the preamble through the PDCCH and the PDSCH corresponding thereto (steps S304 and S306). In the case of a contention-based RACH, a contention resolution procedure may be additionally performed.

The UE which performs the above procedures may receive a PDCCH/PDSCH (step S307) and transmit a Physical Uplink Shared Channel (PUSCH)/Physical Uplink Control Channel (PUCCH) (step S308) according to a general uplink/downlink signal transmission procedure. Especially, the UE receives Downlink Control Information (DCI) through the PDCCH. The DCI includes control information such as resource allocation information for the UE and has different formats according to use purpose.

Meanwhile, control information transmitted by the UE to the eNB through uplink or received by the UE from the eNB through downlink includes a downlink/uplink ACKnowledgment/Negative ACKnowledgment (ACK/NACK) signal, a Channel Quality Indicator (CQI), a Precoding Matrix Index (PMI), a Rank Indicator (RI), and the like. In the case of the 3GPP LTE system, the UE may transmit the control information such as CQI/PMI/RI through the PUSCH and/or the PUCCH.

Hereinafter, a MIMO system will be described. MIMO refers to a method of using multiple transmit antennas and multiple receive antennas to improve data transmission/reception efficiency. Namely, a plurality of antennas is used at a transmitting end or a receiving end of a wireless communication system so that capacity can be increased and performance can be improved. MIMO may also be referred to as 'multi-antenna' in this disclosure.

MIMO technology does not depend on a single antenna path in order to receive a whole message. Instead, MIMO technology collects data fragments received via several antennas, merges the data fragments, and forms complete data. The use of MIMO technology can increase system coverage while improving data transfer rate within a cell area of a specific size or guaranteeing a specific data transfer rate. MIMO technology can be widely used in mobile communication terminals and relay nodes. MIMO technology can overcome the limitations of the restricted amount of transmission data of single antenna based mobile communication systems.

Figure 4:
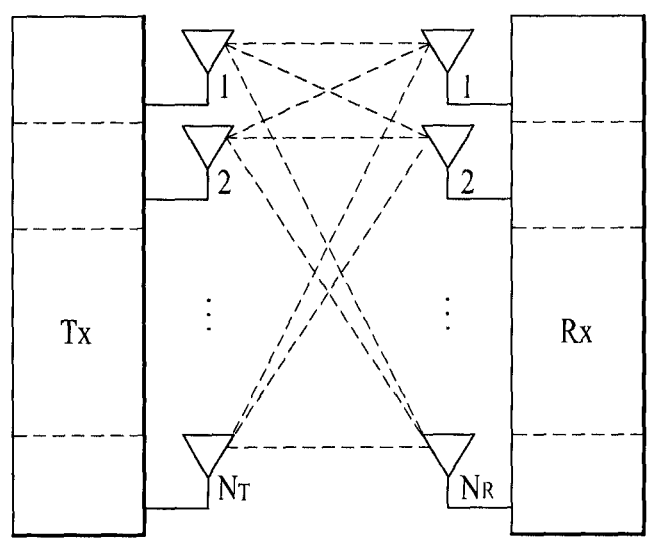
FIG. 4 is a view illustrating the configuration of a MIMO communication system.

The configuration of a MIMO communication system described in the present invention is shown in FIG. 4. A transmitting end is equipped with $N_T$ transmit (Tx) antennas and a receiving end is equipped with $N_R$ receive (Rx) antennas. If a plurality of antennas is used both at the transmitting end and at the receiving end, theoretical channel transmission capacity increases unlike the case in which only either the transmitting end or the receiving end uses a plurality of antennas. Increase in channel transmission capacity is proportional to the number of antennas, thereby improving transfer rate and frequency efficiency. If a maximum transfer rate using a signal antenna is $R_0$, a transfer rate using multiple antennas can be theoretically increased by the product of the maximum transfer rate $R_0$ by a rate increment $R_i$. The rate increment $R_i$ is represented by the following equation 1 where Ri is the smaller of $N_T$ and $N_R$.

$$R_i = \min(N_T, N_R) \qquad \text{[Equation 1]}$$

For example, in a MIMO communication system using four Tx antennas and four Rx antennas, it is possible to theoretically acquire a transfer rate four times that of a single antenna system. After theoretical increase in capacity provided by the MIMO system was first demonstrated in the mid-1990s, various techniques for substantially improving data transfer rate have been under development. Several of these techniques have already been incorporated into a variety of wireless communication standards including, for example, third generation mobile communication and next-generation wireless local area networks.

Active research up to now related to MIMO technology has focused upon a number of different aspects, including research into information theory related to MIMO communication capacity calculation in various channel environments and in multiple access environments, research into wireless channel measurement and model derivation of MIMO systems, and research into space-time signal processing technologies for improving transmission reliability and transfer rate.

To describe a communication method in a MIMO system in detail, a mathematical model thereof is given below. As shown in FIG. 4, it is assumed that $N_T$ Tx antennas and $N_R$ Rx antennas are present. In the case of a transmission signal, a maximum number of transmittable pieces of information is $N_T$ under the condition that $N_T$ Tx antennas are used, so that transmission information can be represented by a vector represented by the following equation 2.

$$s=[s_1,s_2,\ldots,s_{N_T}]^T \qquad \text{[Equation 2]}$$

Meanwhile, individual transmission information pieces $s_1, s_2, \ldots, s_{N_T}$ may have different transmission powers. In this case, if the individual transmission powers are denoted by $P_1, P_2, \ldots, P_{N_T}$, transmission information having adjusted transmission powers can be represented by a vector shown in the following equation 3.

$$\hat{s}=[\hat{s}_1,\hat{s}_2,\ldots,\hat{s}_{N_T}]^T=[P_1s_1,P_2s_2,\ldots,P_{N_T}s_{N_T}]^T \qquad \text{[Equation 3]}$$

The transmission power-controlled transmission information vector $\hat{s}$ may be expressed as follows, using a diagonal matrix P of a transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \qquad \text{[Equation 4]}$$

Meanwhile, $N_T$ transmission signals $x_1, x_2, \ldots, x_{N_T}$ to be actually transmitted may be configured by multiplying the transmission power-controlled information vector $\hat{s}$ by a weight matrix W. In this case, the weight matrix is adapted to properly distribute transmission information to individual antennas according to transmission channel situations. The transmission signals $x_1, x_2, \ldots, x_{N_T}$ can be represented by the following Equation 5 using a vector X. In Equation 5, $W_{ij}$ is a weight between the i-th Tx antenna and the j-th information and W is a weight matrix, which may also be referred to as a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \vdots \\ w_{i1} & w_{i2} & \cdots & w_{iN_T} \\ \vdots & & \ddots & \vdots \\ w_{N_T1} & w_{N_T2} & \cdots & w_{N_TN_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = \qquad \text{[Equation 5]}$$

$$W\hat{s} = WPs$$

Generally, the physical meaning of a rank of a channel matrix may be a maximum number of different pieces of information that can be transmitted in a given channel. Accordingly, since the rank of the channel matrix is defined as the smaller of the number of rows or columns, which are independent of each other, the rank of the matrix is not greater than the number of rows or columns. A rank of a channel matrix H, rank(H), is restricted as follows.

$$\text{rank}(H) \leq \min(N_T, N_R) \qquad \text{[Equation 6]}$$

Each unit of different information transmitted using MIMO technology is defined as a 'transmission stream' or simply 'stream'. The 'stream' may be referred to as a 'layer'. The number of transmission streams is not greater than a rank of a channel which is a maximum number of different pieces of transmittable information. Accordingly, the channel matrix H may be indicted by the following Equation 7.

$$\text{\# of streams} \leq \text{rank}(H) \leq \min(N_T, N_R) \qquad \text{[Equation 7]}$$

Here, '# of streams' denotes the number of streams. It should be noted that one stream may be transmitted through one or more antennas.

There may be various methods of allowing one or more streams to correspond to multiple antennas. These methods may be described as follows according to types of MIMO technology. The case in which one stream is transmitted via multiple antennas may be called spatial diversity, and the case in which multiple streams are transmitted via multiple antennas may be called spatial multiplexing. It is also possible to configure a hybrid of spatial diversity and spatial multiplexing.

Figure 5:
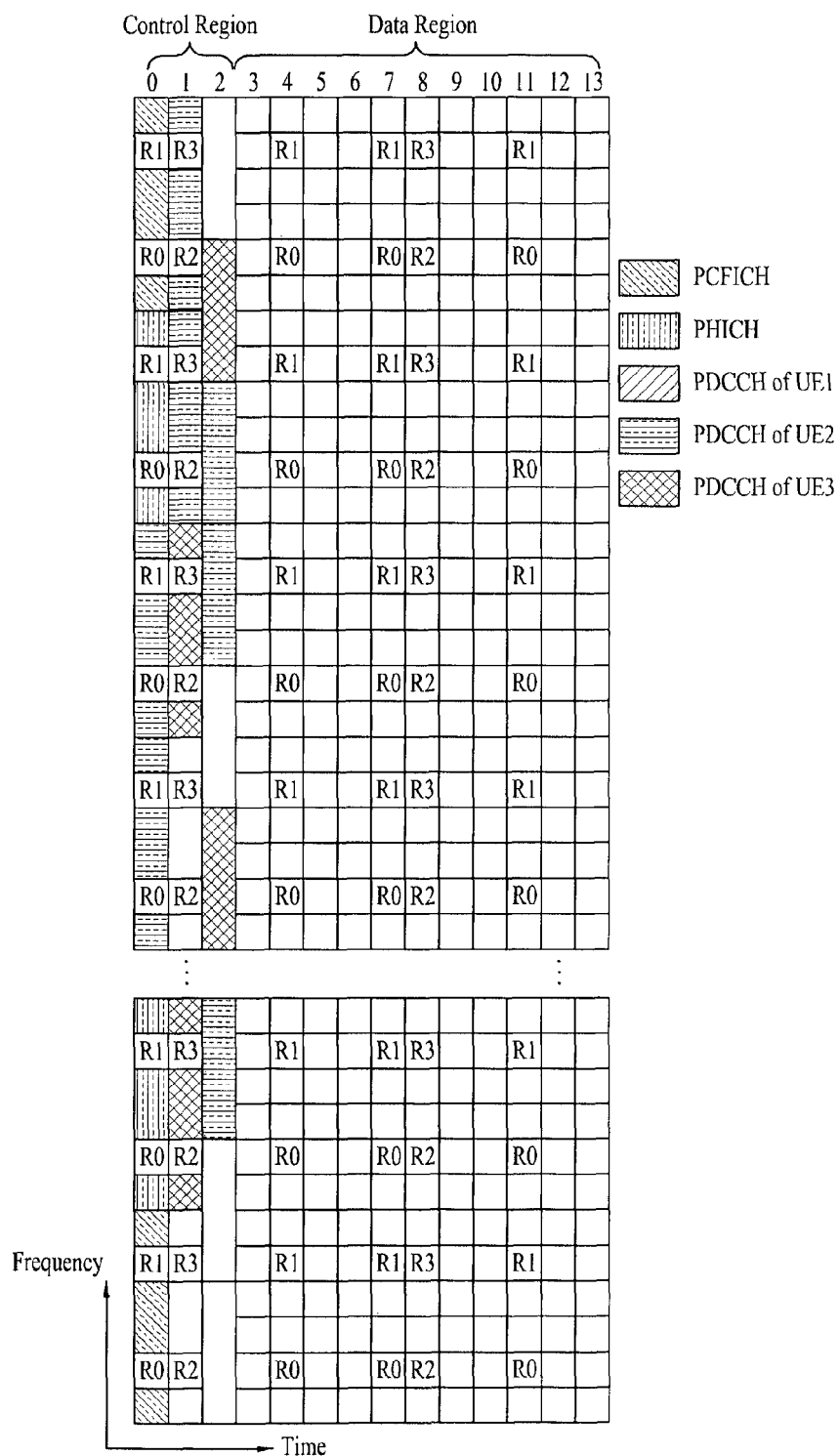
FIG. 5 is a view illustrating the structure of a downlink radio frame used in an LTE system.

FIG. 5 is a view illustrating control channels contained in a control region of one subframe in a downlink radio frame.

Referring to FIG. 5, one subframe includes 14 OFDM symbols. The first to third ones of the 14 OFDM symbols may be used as a control region and the remaining 13 to 11 OFDM symbols may be used as a data region, according to a subframe configuration. In FIG. 5, R1 to R4 represent reference signals (RSs) or pilot signals for antennas 0 to 3, respectively. The RSs are fixed to a predetermined pattern within the subframe irrespective of the control region and the data region. Control channels are allocated to resources to which the RS is not allocated in the control region. Traffic channels are allocated to resources, to which the RS is not allocated, in the data region. The control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH, physical control format indicator channel, informs a UE of the number of OFDM symbols used for the PDCCH per subframe. The PCFICH is located in the first OFDM symbol and is established prior to the PHICH and the PDCCH. The PCFICH is comprised of 4 Resource Element Groups (REGs) and each of the REGs is distributed in the control region based on a cell ID. One REG includes 4 Resource Elements (REs). The RE indicates a minimum physical resource defined as one subcarrier x one OFDM symbol. The PCFICH value indicates values of 1 to 3 or values of 2 to 4 depending on bandwidth and is modulated by Quadrature Phase Shift Keying (QPSK).

The PHICH, physical Hybrid-ARQ indicator channel, is used to transmit a HARQ ACK/NACK signal for uplink transmission. That is, the PHICH indicates a channel through which downlink ACK/NACK information for uplink HARQ is transmitted. The PHICH includes one REG and is cell-specifically scrambled. The ACK/NACK signal is indicated by 1 bit and is modulated by Binary Phase Shift Keying (BPSK). The modulated ACK/NACK signal is spread by a Spreading Factor (SF)=2 or 4. A plurality of PHICHs mapped to the same resource constitutes a PHICH group. The number of PHICHs multiplexed to the PHICH group is determined depending on the number of SFs. The PHICH (group) is repeated three times to obtain diversity gain in a frequency domain and/or a time domain.

The PDCCH is allocated to the first n OFDM symbols of a subframe. In this case, n is an integer greater than 1 and is indicated by the PCFICH. The PDCCH is comprised of one or more control Channel Elements (CCEs). The PDCCH informs each UE or UE group of information associated with resource allocation of a Paging Channel (PCH) and a Downlink-Shared Channel (DL-SCH), uplink scheduling grant, Hybrid Automatic Repeat Request (HARQ) information, etc. Therefore, an eNB and a UE transmit and receive data other than specific control information or specific service data through the PDSCH.

Information indicating to which UE or UEs PDSCH data is to be transmitted, information indicating how UEs are to receive PDSCH data, and information indicating how UEs are to perform decoding are contained in the PDCCH. For example, it is assumed that a specific PDCCH is CRC-masked with a Radio Network Temporary Identity (RNTI) 'A' and information about data, that is transmitted using radio resources 'B' (e.g., frequency location) and transport format information 'C' (e.g., transmission block size, modulation scheme, coding information, etc.), is transmitted through a specific subframe. In this case, a UE located in a cell monitors the PDCCH using its own RNTI information. If one or more UEs having the RNTI 'A' are present, the UEs receive the PDCCH and receive the PDSCH indicated by 'B' and 'C' through the received PDCCH information.

Figure 6:
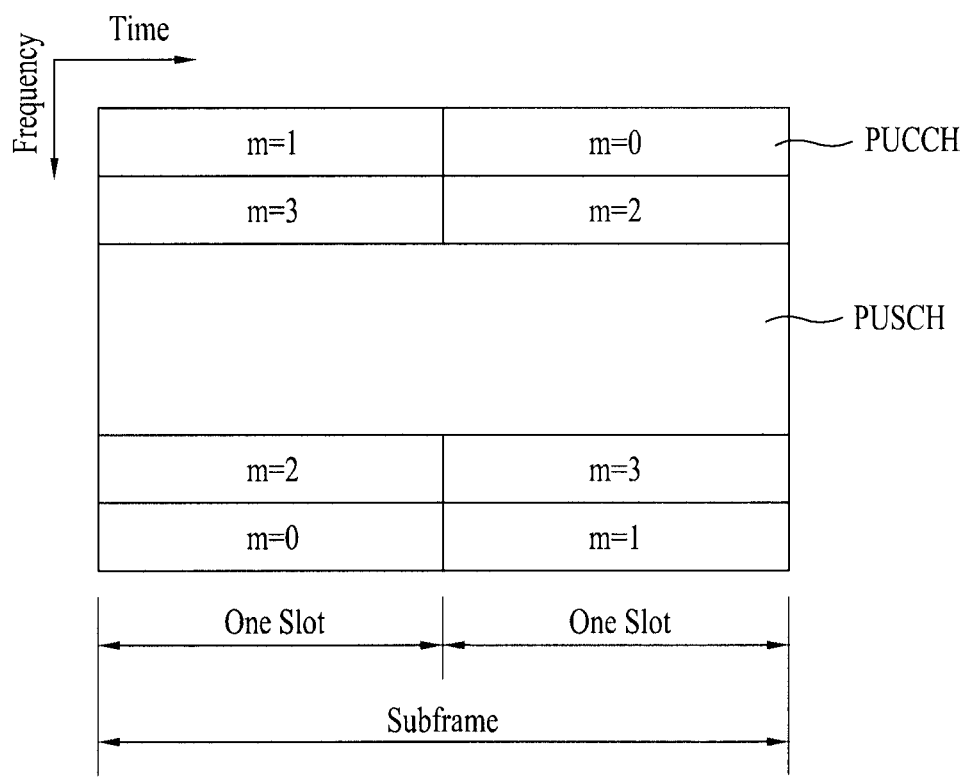
FIG. 6 is a view illustrating the structure of an uplink subframe used in an LTE system.

FIG. 6 illustrates the structure of an uplink subframe used in the LTE system.

Referring to FIG. 6, an uplink subframe is divided into a region to which a PUCCH is allocated to transmit control information and a region to which a PUSCH is allocated to transmit user data. The PUSCH is allocated to the middle of the subframe, whereas the PUCCH is allocated to both ends of a data region in the frequency domain. The control information transmitted on the PUCCH includes an ACK/NACK, a CQI representing a downlink channel state, an RI for Multiple Input and Multiple Output (MIMO), a Scheduling Request (SR) indicating a request for allocation of uplink resources, etc. A PUCCH of a UE occupies one Resource Block (RB) in a different frequency in each slot of a subframe. That is, two RBs allocated to the PUCCH frequency-hop over the slot boundary. Particularly, FIG. 6 illustrates an example in which PUCCHs for m=0, m=1, m=2, and m=3 are allocated to a subframe.

With the emergence and widespread use of various devices requiring Machine-to-Machine (M2M) communication and high transmission rate, data requirements for a cellular network in current wireless communication environments have rapidly increased. To meet required high data transmission rate, communication technology has developed into carrier aggregation technology for efficiently using more frequency bands, MIMO technology for raising data capacity in a limited frequency, and multi-BS cooperative technology. In addition, communication environments have evolved into increasing density of accessible nodes in the vicinity of a user. A system equipped with nodes with high density may have higher system performance by cooperation between nodes. Such a scheme provides much better performance than a non-cooperation scheme in which each node operates as an independent Base Station (BS), Advanced BS (ABS), Node-B (NB), eNode-B (eNB), or Access Point (AP).

The node may be implemented in the form of, for example, a Remote Radio Head (RRH) or an antenna node of a Distributed Antenna System (DAS). The DAS refers to a system for causing a single BS to manage antennas distributed at various locations in a cell, unlike a Centralized Antenna System (CAS) in which antennas are centralized in a cell. The DAS is also different from a femto/pico cell in that multiple antenna nodes constitute one cell.

In the initial stages, the DAS was used to repeatedly transmit signals by further installing antennas to cover a shadow area. However, the DAS may be considered a sort of a MIMO system because BS antennas can support one or plural users by simultaneously transmitting and receiving multiple data streams. Due to high frequency efficiency, the MIMO system has been recognized as an indispensable factor for satisfying requirements of next-generation communication. From the viewpoint of the MIMO system, the DAS has more advantages than the CAS, such as high power efficiency obtained by decrease in the distance between a user and an antenna, high channel capacity caused by low correlation and interference between BS antennas, and communication performance of relatively uniform quality irrespective of location of a user in a cell.

Figure 7:
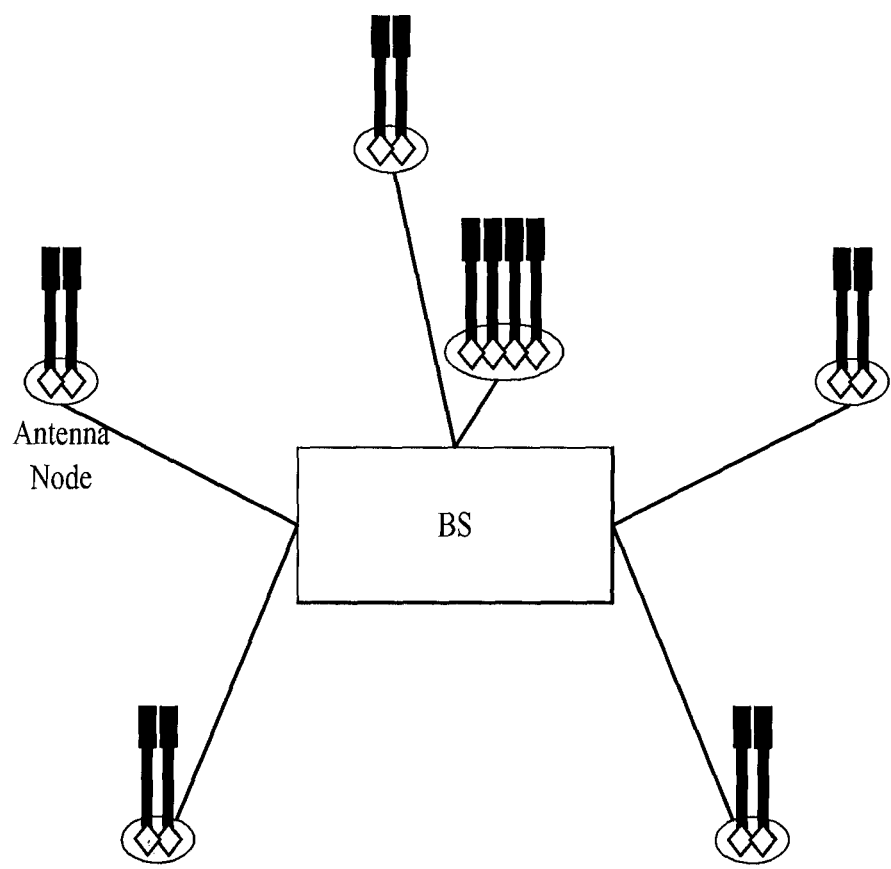
FIG. 7 is a view illustrating the configuration of a DAS in a next-generation communication system.

FIG. 7 is a view illustrating the configuration of a DAS in a next-generation communication system.

Referring to FIG. 7, the DAS includes a BS and antenna nodes connected to the BS. The antenna nodes are connected to the BS by wire or wirelessly. Each of the antenna nodes may include one to several antennas. Generally, antennas belonging to one antenna node have characteristics that the distance between the nearest antennas is less than a few meters and, therefore, the antennas belong to the same regional spot. An antenna node serves as an AP that a UE can access. In a conventional DAS, generally, no distinction is made between an antenna node and an antenna, as the antenna node and the antenna are treated the same. In actuality, however, the relationship between the antenna node and the antenna should certainly be defined to efficiently manage the DAS.

Figure 8:
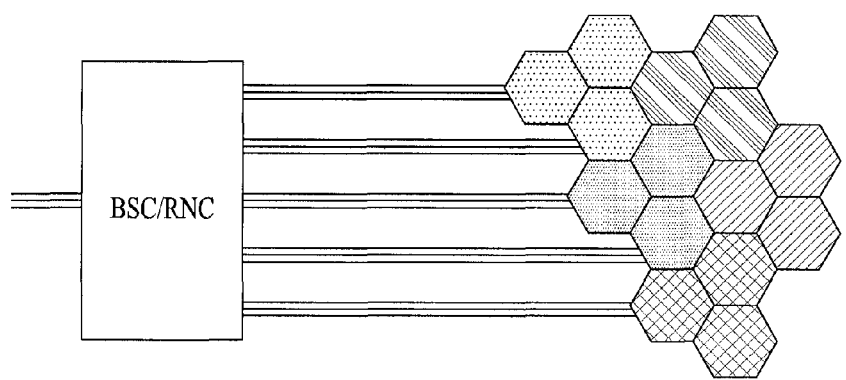
FIG. 8 is a view illustrating the concept of a BTS hotel in a DAS.
Figure 8:
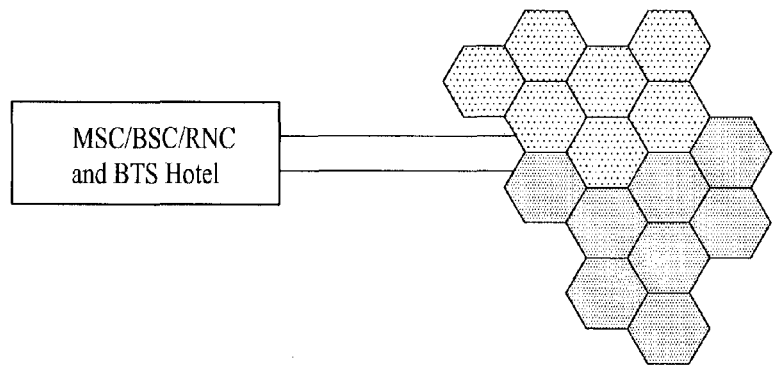

FIG. 8 is a view illustrating the concept of a Base Transceiver Station (BTS) hotel in a DAS.

FIG. 8(a) illustrates a conventional cellular system. As shown, one BTS manages three sectors and each BTS is connected to a Base Station Controller (BSC)/Radio Network Controller (RNC) through a backbone network.

However, in the DAS as shown in FIG. 8(b), BTSs connected to each antenna node are gathered in one place. This is referred to as a BTS hotel. In this system, costs for land and buildings in which the BTSs are to be installed can be reduced and maintenance and management for the BTS can be easily carried out in one place. In addition, backhaul capacity can be greatly increased by installing the BTS and the Mobile Station Center (MSC)/BSC/RNC in one place.

Figure 9:
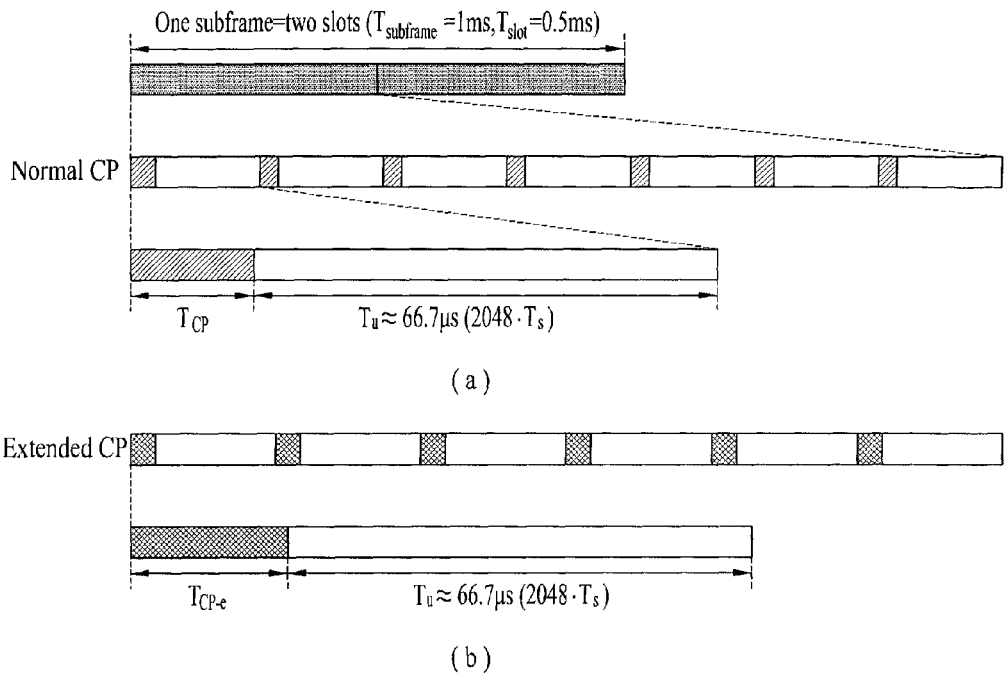
FIG. 9 is a view illustrating the structure of a frame used in a legacy LTE system.

FIG. 9 illustrates the structure of a frame used in a legacy LTE system. More specifically, FIG. 9(a) illustrates the frame in a normal Cyclic Prefix (CP) and FIG. 9(b) illustrates the frame in an extended CP.

In the LTE system, two types of frame structures are supported as illustrated in FIG. 9. This is for the LTE system to support various scenarios of a cellular system. Actually, the LTE system covers environments of an indoor cell, an urban cell, a suburban cell, and a rural cell and supports movement speed of a UE up to 350 to 500 km. A center frequency operating in the LTE system is generally 400

MHz to 4 GHz and an available frequency bandwidth is 1:4 to 20 MHz. This means that delay spread and Doppler frequency may differ according to the center frequency and the available frequency bandwidth.

Referring to FIG. 9, a radio frame is 10 ms (327200×$T_S$) in length and includes 10 equal-sized subframes. Each subframe is 1 ms in length and includes two slots each being 0.5 ms (15360×$T_S$) long. Here, $T_S$ denotes sampling time expressed as $T_S=1/(15 \text{ kHz} \times 2048)=3.2552 \times 10^{-8} \approx 33$ ns.

Meanwhile, in case of a normal CP, CP length $T_{CP}$ is 160×$T_S$, i.e. 5.1 μs, in the first symbol, whereas CP length $T_{CP}$ is 144×$T_S$, i.e. 4.7 μs, in the other symbols with a subcarrier spacing Δf of 15 kHz. However, in case of an extended CP, although the subcarrier spacing Δf is 15 kHz, which is the same as in the normal CP, CP length $T_{CP-e}$ is 512×$T_S$, i.e. about 16.7 μs.

Accordingly, the extended CP may support a relatively wide suburban cell or rural cell due to long CP length. Generally, delay spread is increased in a suburban cell or rural cell and, therefore, the extended CP having a relatively long duration is needed to certainly solve Inter Symbol Interference (ISI). However, there is a trade-off at which loss of frequency efficiency/transmission resources is generated due to relative increase of overhead.

Hereinafter, a reference signal will be described in more detail.

Generally, to measure a channel, a Reference Signal (RS) known to a transmitting side and a receiving side is transmitted together with data from the transmitting side to the receiving side. Such an RS serves to perform a demodulation process by indicating a modulation scheme as well as channel measurement. The RS is classified into a dedicated RS (DRS), i.e. a UE-specific RS, for a BS and a specific UE and a Common RS, i.e. Cell-Specific RS (CRS), for all UEs in a cell. The CRS includes an RS for reporting a measurement result for CQI/PMI/RI measured in a UE to a BS and this RS is referred to as a Channel State Information-RS (CSI-RS).

Figure 10:
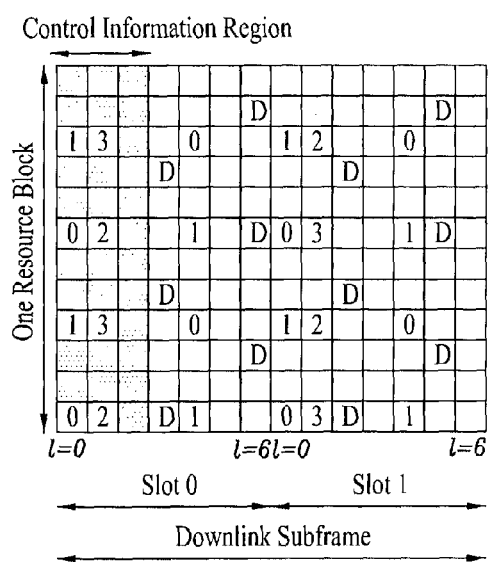
FIG. 10 and FIG. 11 are views illustrating the structure of downlink RSs in an LTE system supporting downlink transmission using four antennas.
Figure 11:
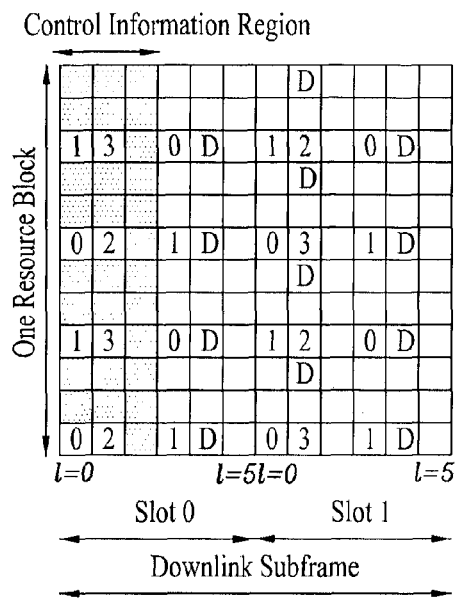

FIG. 10 and FIG. 11 are views illustrating the structure of RSs in an LTE system supporting downlink transmission using four antennas. Specifically, FIG. 10 illustrates the structure of the RS in a normal CP and FIG. 11 illustrates the structure of the RS in an extended CP.

Referring to FIGS. 10 and 11, numbers 0 to 3 denoted in lattices indicate CRSs, i.e. cell-specific RSs, transmitted for channel measurement and data demodulation in correspondence to antenna ports 0 to 3, respectively. The CRSs may be transmitted to the UE in all control information regions as well as in data information regions.

In addition, D's denoted in lattices indicate downlink Demodulation-RSs (DM-RSs) which are UE-specific RSs. The DM-RSs support transmission of a single antenna port through a data region, i.e. through a PDSCH. Whether or not the DM-RS, which is a UE-specific RS, is present is signaled to the UE through higher layers. In FIGS. 10 and 11, DM-RSs corresponding to an antenna port 5 are illustrated. In the 3GPP standard document 36.211, DM-RSs for a total of 8 antenna ports, from an antenna port 7 to an antenna port 14, are defined.

Figure 12:
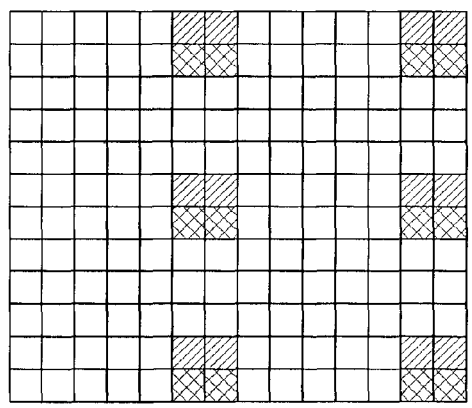
FIG. 12 illustrates an example of downlink DM-RS allocation defined in a current 3GPP standard document.

FIG. 12 illustrates an example of downlink DM-RS allocation defined in the current 3GPP standard document.

Referring to FIG. 12, DM-RSs corresponding to antenna ports {7, 8, 11, 13} are mapped using a sequence per antenna port in a DM-RS group 1. DM-RSs corresponding to antenna ports {9, 10, 12, 14} are also mapped using a sequence per antenna port in a DM-RS group 2.

Meanwhile, the above-described CSI-RS has been proposed for the purpose of channel measurement for a PDSCH, separately from the CRS. Unlike the CRS, the CSI-RS may be defined as a maximum of 32 different CSI-RS configurations to reduce Inter-Cell Interference (ICI) in a multi-cell environment.

A CSI-RS configuration varies according to the number of antenna ports. CSI-RSs configured as differently as possible between neighboring cells are defined. The CSI-RS supports a maximum of 8 antennas unlike the CRS. In the 3GPP standard document, a total of 8 antennas, from an antenna port 15 to an antenna port 22, is allocated as antenna ports for the CSI-RS. The following Table 1 and Table 2 show CSI-RS configurations defined in the 3GPP standard document. Specially, Table 1 shows CSI-RS configurations in a normal CP and Table 2 shows CSI-RS configurations in an extended CP.

TABLE 1

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (9, 5) | 0 | (9, 5) | 0 | (9, 5) | 0 |
| | 1 | (11, 2) | 1 | (11, 2) | 1 | (11, 2) | 1 |
| | 2 | (9, 2) | 1 | (9, 2) | 1 | (9, 2) | 1 |
| | 3 | (7, 2) | 1 | (7, 2) | 1 | (7, 2) | 1 |
| | 4 | (9, 5) | 1 | (9, 5) | 1 | (9, 5) | 1 |
| | 5 | (8, 5) | 0 | (8, 5) | 0 | | |
| | 6 | (10, 2) | 1 | (10, 2) | 1 | | |
| | 7 | (8, 2) | 1 | (8, 2) | 1 | | |
| | 8 | (6, 2) | 1 | (6, 2) | 1 | | |
| | 9 | (8, 5) | 1 | (8, 5) | 1 | | |
| | 10 | (3, 5) | 0 | | | | |
| | 11 | (2, 5) | 0 | | | | |
| | 12 | (5, 2) | 1 | | | | |
| | 13 | (4, 2) | 1 | | | | |
| | 14 | (3, 2) | 1 | | | | |
| | 15 | (2, 2) | 1 | | | | |
| | 16 | (1, 2) | 1 | | | | |
| | 17 | (0, 2) | 1 | | | | |
| | 18 | (3, 5) | 1 | | | | |

TABLE 1-continued

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 2 only | 19 | (2, 5) | 1 | | | | |
| | 20 | (11, 1) | 1 | (11, 1) | 1 | (11, 1) | 1 |
| | 21 | (9, 1) | 1 | (9, 1) | 1 | (9, 1) | 1 |
| | 22 | (7, 1) | 1 | (7, 1) | 1 | (7, 1) | 1 |
| | 23 | (10, 1) | 1 | (10, 1) | 1 | | |
| | 24 | (8, 1) | 1 | (8, 1) | 1 | | |
| | 25 | (6, 1) | 1 | (6, 1) | 1 | | |
| | 26 | (5, 1) | 1 | | | | |
| | 27 | (4, 1) | 1 | | | | |
| | 28 | (3, 1) | 1 | | | | |
| | 29 | (2, 1) | 1 | | | | |
| | 30 | (1, 1) | 1 | | | | |
| | 31 | (0, 1) | 1 | | | | |

TABLE 2

| | | Number of CSI reference signals configured | | | | | |
|---|---|---|---|---|---|---|---|
| | CSI reference signal | 1 or 2 | | 4 | | 8 | |
| | configuration | (k', l') | $n_s$ mod 2 | (k', l') | $n_s$ mod 2 | (k', l') | $n_s$ mod 2 |
| Frame structure type 1 and 2 | 0 | (11, 4) | 0 | (11, 4) | 0 | (11, 4) | 0 |
| | 1 | (9, 4) | 0 | (9, 4) | 0 | (9, 4) | 0 |
| | 2 | (10, 4) | 1 | (10, 4) | 1 | (10, 4) | 1 |
| | 3 | (9, 4) | 1 | (9, 4) | 1 | (9, 4) | 1 |
| | 4 | (5, 4) | 0 | (5, 4) | 0 | | |
| | 5 | (3, 4) | 0 | (3, 4) | 0 | | |
| | 6 | (4, 4) | 1 | (4, 4) | 1 | | |
| | 7 | (3, 4) | 1 | (3, 4) | 1 | | |
| | 8 | (8, 4) | 0 | | | | |
| | 9 | (6, 4) | 0 | | | | |
| | 10 | (2, 4) | 0 | | | | |
| | 11 | (0, 4) | 0 | | | | |
| | 12 | (7, 4) | 1 | | | | |
| | 13 | (6, 4) | 1 | | | | |
| | 14 | (1, 4) | 1 | | | | |
| | 15 | (0, 4) | 1 | | | | |
| Frame structure type 2 only | 16 | (11, 1) | 1 | (11, 1) | 1 | (11, 1) | 1 |
| | 17 | (10, 1) | 1 | (10, 1) | 1 | (10, 1) | 1 |
| | 18 | (9, 1) | 1 | (9, 1) | 1 | (9, 1) | 1 |
| | 19 | (5, 1) | 1 | (5, 1) | 1 | | |
| | 20 | (4, 1) | 1 | (4, 1) | 1 | | |
| | 21 | (3, 1) | 1 | (3, 1) | 1 | | |
| | 22 | (8, 1) | 1 | | | | |
| | 23 | (7, 1) | 1 | | | | |
| | 24 | (6, 1) | 1 | | | | |
| | 25 | (2, 1) | 1 | | | | |
| | 26 | (1, 1) | 1 | | | | |
| | 27 | (0, 1) | 1 | | | | |

Figure 13:
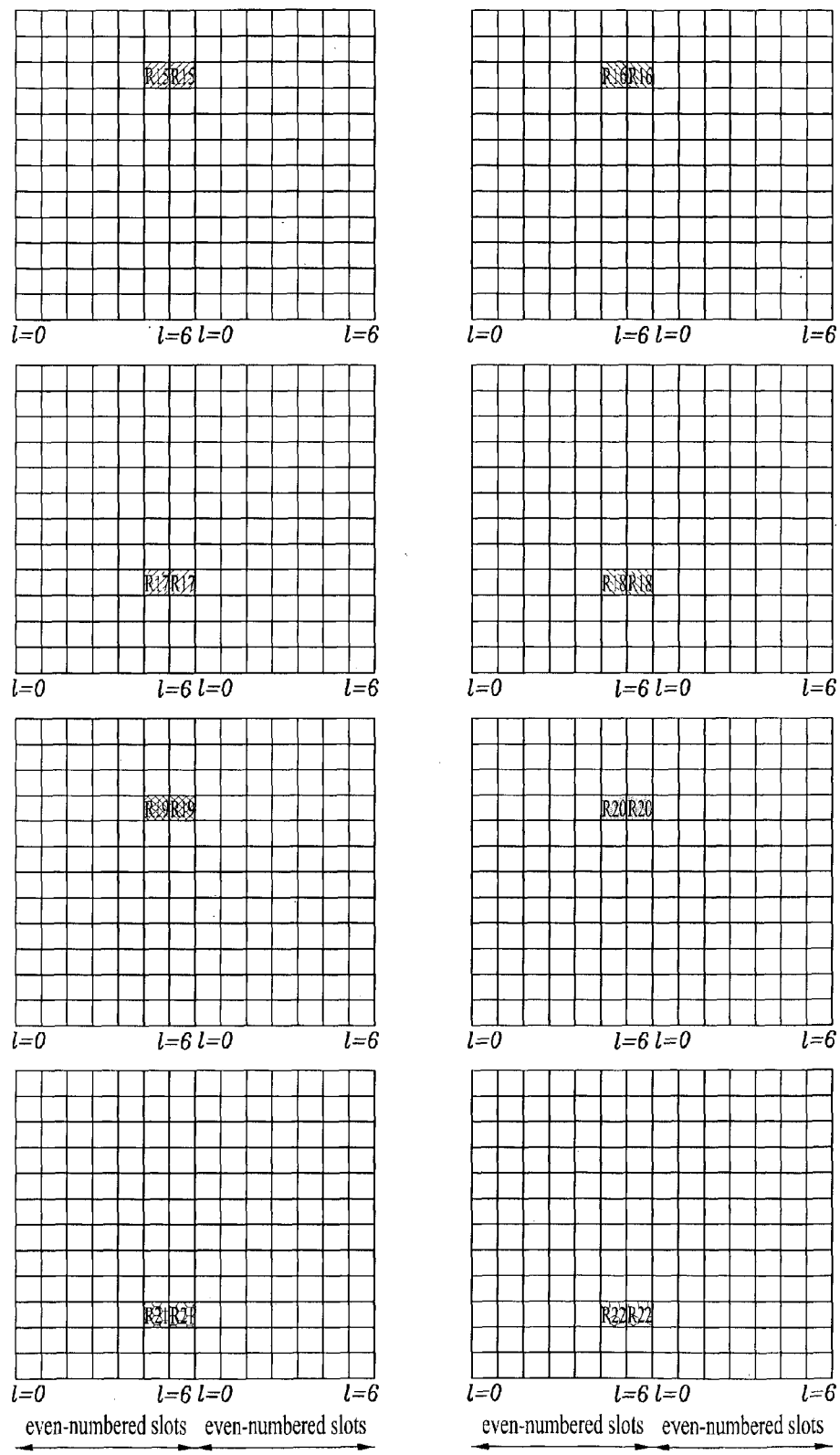
FIG. 13 illustrates CSI-RS configuration #0 in a normal CP among downlink CSI-RS configurations defined in the current 3GPP standard document.

In Table 1 and Table 2, (k',l') denotes an RE index, k' denotes a subcarrier index, and l' denotes an OFDM symbol index. FIG. 13 illustrates CSI-RS configuration #0 in a normal CP among CSI-RS configurations defined in the current 3GPP standard document.

In addition, a CSI-RS subframe configuration may be defined. The CSI-RS subframe configuration is represented by a periodicity $T_{CSI-RS}$ and a subframe offset $\Delta_{CSI-RS}$, expressed in subframes. The following Table 3 indicates CSI-RS subframe configurations defined in the 3GPP standard document.

TABLE 3

| CSI-RS-SubframeConfig $I_{CSI-RS}$ | CSI-RS periodicity $T_{CSI-RS}$ (subframes) | CSI-RS subframe offset $\Delta_{CSI-RS}$ (subframes) |
|---|---|---|
| 0-4 | 5 | $I_{CSI-RS}$ |
| 5-14 | 10 | $I_{CSI-RS}$ − 5 |
| 15-34 | 20 | $I_{CSI-RS}$ − 15 |
| 35-74 | 40 | $I_{CSI-RS}$ − 35 |
| 75-154 | 80 | $I_{CSI-RS}$ − 75 |

For a future LTE system, introduction of a local area has been considered. That is, to intensify service support per user, new cell deployment of the concept of local area access is expected to be introduced.

Figure 14:
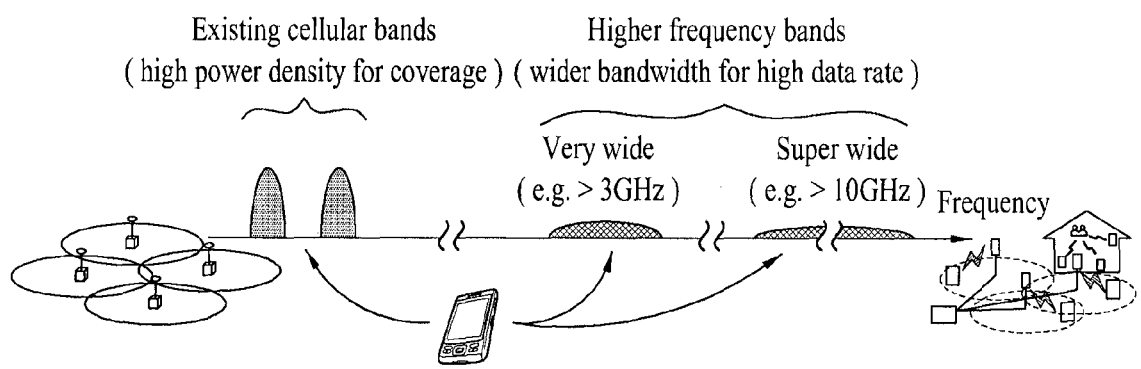
FIG. 14 is a view illustrating the concept of a small cell which is expected to be introduced in a future LTE system.

FIG. 14 is a view illustrating the concept of a small cell which is expected to be introduced in a future LTE system.

Referring to FIG. 14, it is expected to configure a wider system bandwidth in a frequency band having a higher center frequency rather than in a frequency band operating in a legacy LTE system. Basic cell coverage is supported based on a control signal such as system information through an existing cellular band and, in a small cell of a higher frequency band, data transmission for maximizing transmission efficiency may be performed using a wider frequency bandwidth. Accordingly, in the concept of local area access, target UEs may correspond to UEs having low to medium mobility located at a narrower area and target cells may correspond to small cells in which the distance between the UE and the BS is a few hundred meters which is shorter than an existing cell of a few kilometers.

In these cells, the distance between the UE and the BS is short and a high frequency band is used. As a result, the following channel characteristics may be expected.

First, in an aspect of delay spread, a signal delay may be shortened as the distance between the BS and the UE decreases. Additionally, in an aspect of a subcarrier spacing, when an OFDM-based frame, which is the same as in the LTE system, is applied, a much larger value than an existing 15 KHz may be set as the subcarrier spacing because an assigned frequency band is relatively large. Last, in an aspect of a Doppler frequency, a higher Doppler frequency at the same movement speed of a UE is obtained due to use of a high frequency band and, thus, a coherence time may be remarkably shortened. The coherence time refers to a time duration during which channels have static or uniform characteristics over time. A coherence bandwidth refers to bandwidth in which channels show static or uniform characteristics over time.

Meanwhile, in a legacy LTE system, the density and pattern of RSs have been designed based on the coherence time derived from a maximum Doppler frequency. Through this, the UE may perform channel estimation and received data demodulation. Actually, assuming that a center frequency is 2 GHz and the movement speed of the UE is 500 km/h in the LTE system, a maximum Doppler frequency is 950 Hz, i.e. about 1000 Hz. Generally, the coherence time can be obtained from 50% of the inverse of the maximum Doppler frequency. Accordingly, the relationship such as Equation 8 may be satisfied in the LTE system.

$$T_C = \frac{1}{2f_d} \cong 0.5 \text{ ms} \quad \text{[Equation 8]}$$

In Equation 8, $T_C$ denotes a coherence time and $f_d$ denotes a Doppler frequency. This relationship may mean that a maximum of two RSs is needed within the coherence time and further mean that channel estimation is possible in all mobile situations up to a maximum movement speed of the UE, i.e. 500 km/h, through such an RS pattern.

However, in a high frequency band having a center frequency of a few tens of GHz, even a relatively low-speed UE may experience a high Doppler frequency. For example, if a center frequency $f_c$ is 2 GHz and 20 GHz and a UE movement speed v is 30 km/h, i.e. (30/3600) km/s, then a maximum Doppler frequency $f_d$ may be expressed by the following Equation 9 and Equation 10. In Equation 9 and Equation 10, c is $3 \times 10^8$ m/s, the speed of light in a vacuum.

$$f_d = \frac{v}{c} \times f_c = \frac{(30 \times 10^3)/3600}{3 \times 10^8} \times (2 \times 10^9) = 55.6 \text{ Hz} \quad \text{[Equation 9]}$$

$$f_d = \frac{v}{c} \times f_c = \frac{(30 \times 10^3)/3600}{3 \times 10^8} \times (20 \times 10^9) = 556 \text{ Hz} \quad \text{[Equation 10]}$$

In addition, due to the nature of a high frequency band, a varied characteristic and a direct compensation scheme may be applied to a Doppler spectrum, unlike a few existing channels. In the high frequency band, since a wavelength λ constituting an antenna element generally becomes short, massive antennas may be configured to contain many antennas in the same space and it may be easy to apply a narrow beamforming scheme through the massive antennas.

Further, due to a high center frequency of a few tens of GHz, greater path loss than in a basic frequency of a few GHz is generated and additional path loss is also generated due to the nature of the high frequency band. Accordingly, since additional path attenuation of components reflected through scattering among existing multipath channels is relatively significant, an environment in which a BS can easily apply the narrow beamforming scheme is provided.

Figure 15:
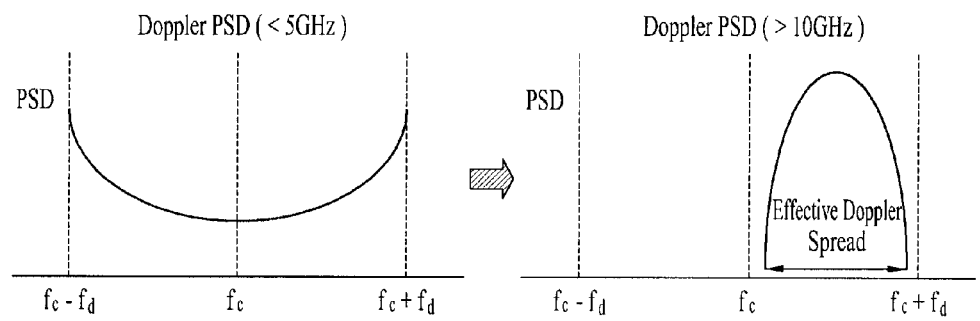
FIG. 15 is a view illustrating Doppler spectrum distribution during narrow beamforming in a high frequency band.

Since narrow beamforming allows a receiver of a UE to receive signals only in a specific direction rather than in all directions, a relatively sharp Doppler spectrum is obtained as illustrated in FIG. 15.

FIG. 15 is a view illustrating Doppler spectrum distribution during narrow beamforming in a high frequency band. Specifically, FIG. 15 is a view comparing a general frequency band less than 5 GHz with a high frequency band greater than 10 GHz. In FIG. 15, Power Spectral Density (PSD) indicates power distribution of a signal according to a frequency and expresses a probability density function of a Doppler signal.

In the case in which characteristics of a Doppler spectrum considering narrow beamforming are used, the spectrum is not Doppler-spread over all regions but condensed in a partial region. Accordingly, the receiver may reduce a final Doppler frequency as shown in FIG. 16, using an Automatic Frequency Control or Adaptive Frequency Control (AFC) function.

Figure 16:
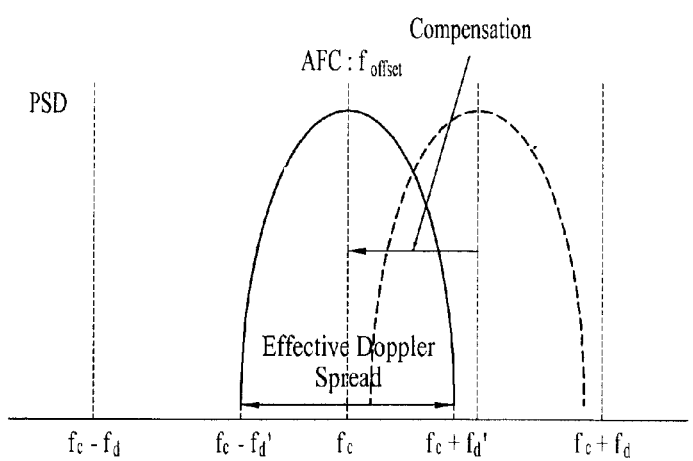
FIG. 16 is a view conceptually illustrating reduction of a Doppler frequency using an AFC function during narrow beamforming in a high frequency band.

FIG. 16 is a view conceptually illustrating reduction of a Doppler frequency using an AFC function during narrow beamforming in a high frequency band.

Referring to FIG. 16, it may be appreciated that a maximum Doppler frequency $f_d$ is reduced to $f_d'(<f_d)$ through the AFC function. Furthermore, referring to the afore-mentioned Equation 8, since the maximum Doppler frequency and the coherence time are inversely proportional, reduction of the maximum Doppler frequency means increase of the coherence time. This represents that a channel is invariant in the time domain for a longer time.

As described above, if the narrow beamforming scheme is applied in the high frequency band, the Doppler spectrum is condensed in a specific region. As a result, it may be appreciated that the narrow beamforming scheme is favorably applied in the high frequency band and this means that a low rank is formed between a UE and a BS.

In other words, as the narrow beamforming scheme is well applied between the BS and the UE, a low-rank channel having good quality, i.e. a single-rank channel as an extreme case, may be formed. The single rank represents that the number of streams capable of performing simultaneous transmission between the BS and the UE is one and the reason is that plural distinguishable channels are not generated due to similarity between channels. However, a beam of the BS is well formed towards the UE and, therefore, link quality of the UE is improved.

Figure 17:
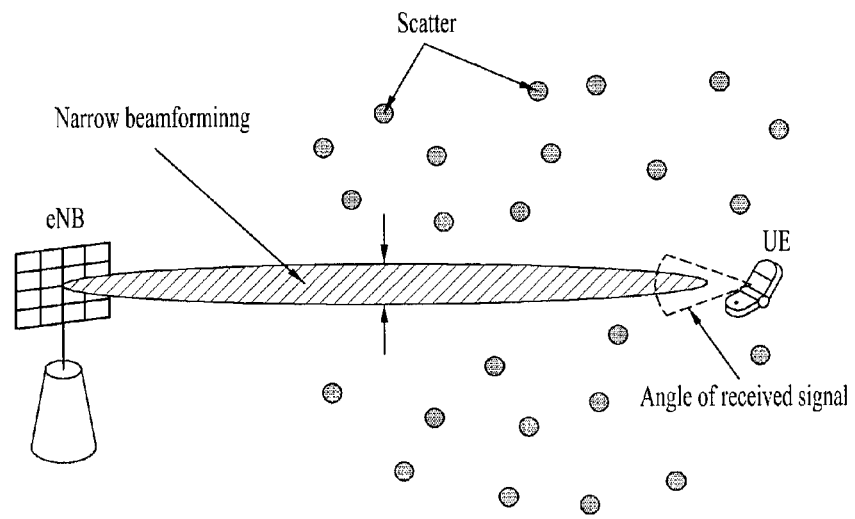
FIG. 17 is a view conceptually illustrating beam formation when narrow beamforming is applied between a BS and a UE.

FIG. 17 is a view conceptually illustrating beam formation when narrow beamforming is applied between a BS and a UE.

Referring to FIG. 17, beams are gathered towards the UE and, thus, signals headed for neighboring scatters appear. The UE receive signals only in a specific direction rather than in all directions. Consequently, the Doppler spectrum as illustrated in FIG. 16 is generated.

This means that an effective Doppler spectrum becomes narrow as illustrated in FIG. 16 and the coherence time inversely proportional to a Doppler frequency increases. This also means that a static situation in which a channel is invariant for a longer time in the time domain is generated.

Figure 18:
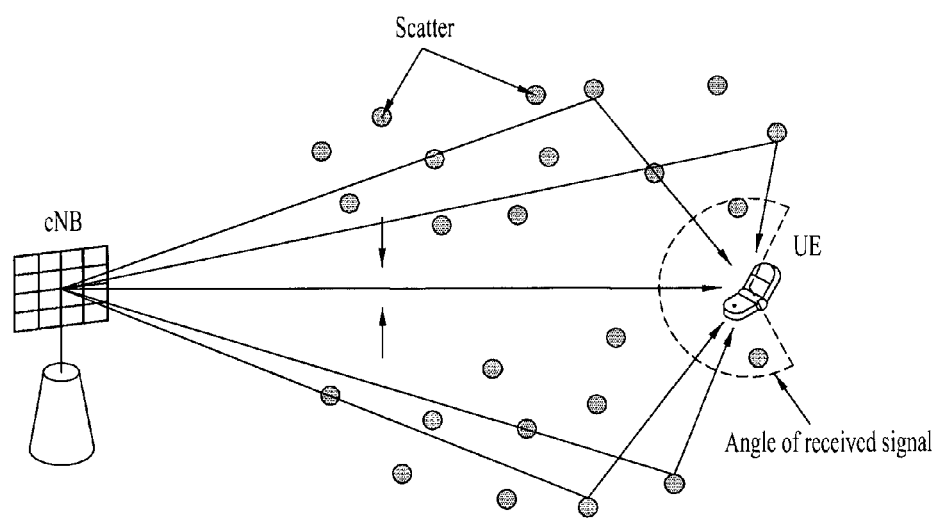
FIG. 18 is view conceptually illustrating beam formation when narrow beamforming is not applied between a BS and a UE.

FIG. 18 is view conceptually illustrating beam formation when narrow beamforming is not applied between a BS and a UE.

Referring to FIG. 18, if a narrow beam is not formed, the UE receives signals in various directions through scatters in the vicinity thereof. This means that a Doppler frequency increases again and distinguishable multi-path channels are formed between the BS and the UE. This also intuitively means that ranks capable of simultaneously transmitting a plurality of streams increases.

Based on the above-described description, the present invention proposes an RS design method considering a rank formed between the BS and the UE and coherence time variation corresponding to the rank.

First Embodiment

First, an RS pattern may be defined such that density of RSs for estimating a channel of each rank in the time domain increases as a rank between the UE and the BS increases.

Specifically, during application of narrow beamforming or in a narrow beam formation environment, a rank of a channel is low and a channel environment having good rank quality is formed. In addition, during application of narrow beamforming or in a narrow beam formation environment, since the UE may receive signals only in a predetermined direction, effective Doppler spread in the frequency domain decreases and a coherence time in the time domain increases. This means that the UE may use less RSs for channel estimation.

Conversely, if a narrow beam is not formed well, since the UE receives signal through multiple paths, Doppler spread increases and a coherence time is reduced. Accordingly, unlike narrow beamforming, more RSs for channel estimation in the time domain are needed and time-domain RS density per rank should increase as a channel rank increases during RS pattern design in the time domain.

Figure 19:
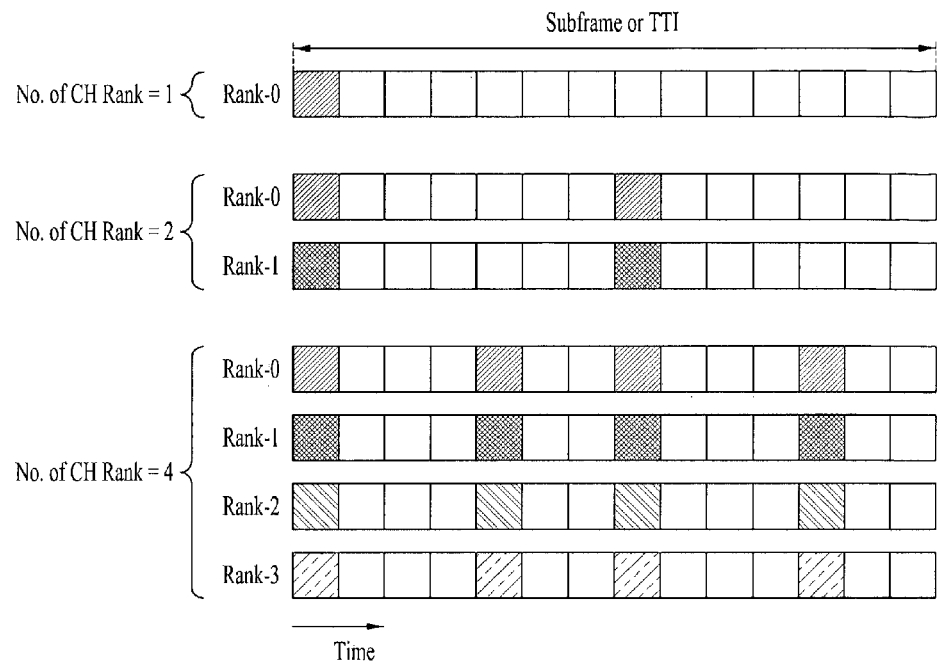
FIG. 19 is a view illustrating time-domain RS density variation according to rank variation according to a first embodiment of the present invention.

For a more detailed description, reference is made to FIG. 19. FIG. 19 is a view illustrating time-domain RS density variation according to rank variation according to a first embodiment of the present invention. Referring to FIG. 19, it may be appreciated that as a rank of a channel increases, time-domain RS density for channel estimation for each rank also increases.

Further, if RS density in the frequency domain is determined, a prescribed RS pattern may be configured. RS density in the frequency domain is determined according to channel characteristics, i.e. coherence bandwidth.

Figure 20:
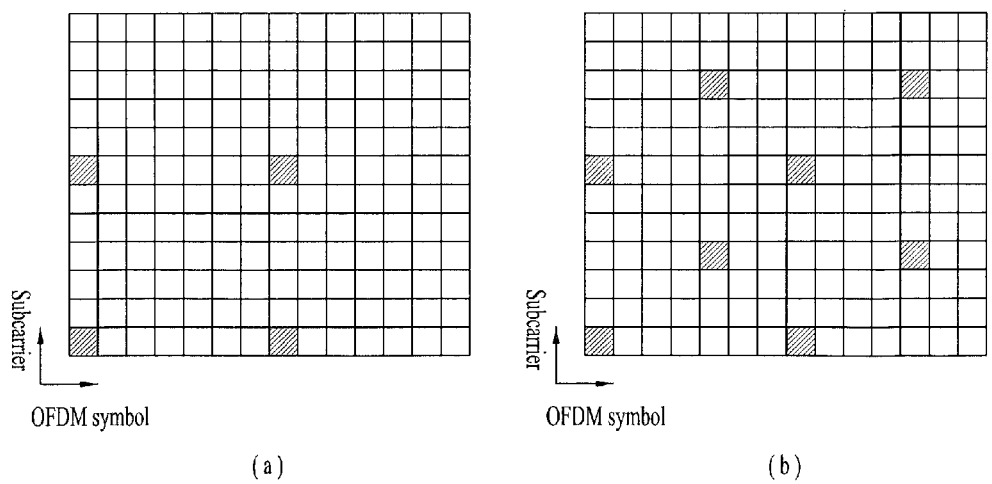
FIG. 20 illustrates an RS pattern considering rank variation per channel according to a first embodiment of the present invention.

FIG. 20 illustrates an RS pattern considering rank variation per channel according to a first embodiment of the present invention. Specifically, FIG. 20(a) illustrates an RS pattern for a low rank and FIG. 20(b) illustrates an RS pattern for a high rank.

More specifically, the BS may first define a basic RS pattern for a low rank and, if a rank of a channel increases, the BS may configure an RS pattern of a hierarchical structure in which RSs are added to an existing pattern. Alternatively, the BS may first define a basic RS pattern for a high rank and, when a rank of a channel decreases, the BS may configure an RS pattern of a structure in which RSs are eliminated from an existing pattern.

That is, an RS pattern per rank may be configured in a form of eliminating or adding RSs from or to a basic structure rather than in an independent form. In this case, completely different RS patterns for ranks need not be configured. For example, since a narrow beam is well formed in a low rank as illustrated in FIG. 20, the RS pattern of FIG. 20(a) may be used for a single rank and, if the number of ranks increases, RS density of each rank may increase by adding specific RSs as illustrated in FIG. 20(b).

Second Embodiment

Next, a method may be considered in which the BS determines an RS pattern per UE or per cell using channel rank information fed back from one or more UEs and transmits information about the determined RS pattern to the UE.

To this end, the UE should estimate a channel rank with the BS. The UE configures feedback information based on the estimated channel rank and link quality and transmits the feedback information to the BS. The BS may configure an RS pattern suitable for the UE based on the information fed back from the UE and transmit RS pattern configuration information to the UE.

Meanwhile, the UE may select a preferred RS pattern using the estimated channel rank and transmit information about the preferred RS pattern to the BS. The BS configures an RS pattern to be actually applied using the preferred RS pattern received from the UE. That is, the UE should estimate a channel rank with the BS. The UE selects a preferred RS pattern suitable therefor based on estimated information and feeds back information about the preferred RS pattern to the BS. The BS may configure an RS pattern suitable for the UE based on the information about the preferred RS pattern fed back from the UE and signal information about the actually configured RS pattern to the UE.

Additionally, if the above-described RS is a DM-RS used for data demodulation of the UE, it is possible to configure a UE-specific RS pattern. However, a UE-group-specific RS pattern or a cell-specific RS pattern may be configured according to a specific purpose such as control channel transmission or broadcast information transmission.

Third Embodiment

The BS may directly estimate/predict a channel rank with the UE and define an RS pattern per UE or per cell using information about the channel rank. That is, the BS should directly estimate the channel rank to determine an RS pattern without feedback of the UE.

The BS may estimate the channel rank using a UL sounding RS. In a TDD system, the BS may estimate the channel rank of the UE without additional feedback using reciprocity of an uplink channel and a downlink channel. Next, the BS may determine an RS pattern of low density capable of maximizing resource efficiency during data channel transmission by estimating an AFC range and transmit information about the RS pattern to the UE.

Similarly to the foregoing description, if the above-described RS is a DM-RS used for data demodulation of the UE, it is possible to configure a UE-specific RS pattern. However, a UE-group-specific RS pattern or a cell-specific RS pattern may be configured according to a specific purpose such as control channel transmission or broadcast information transmission.

Figure 21:
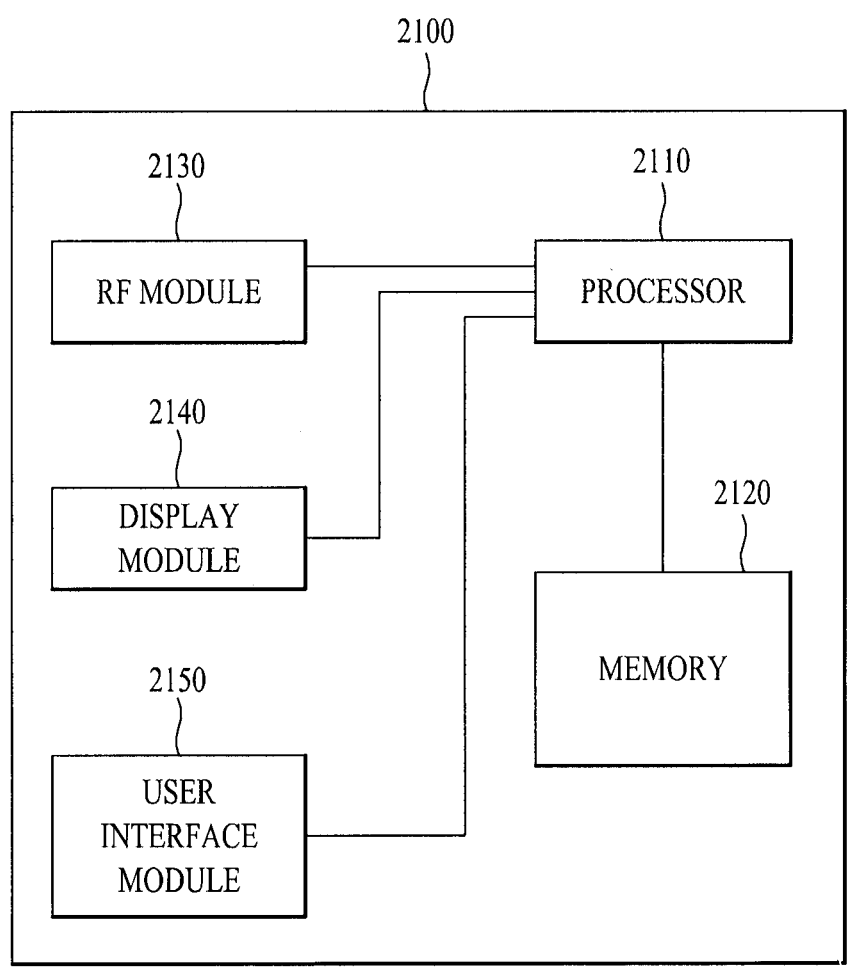
FIG. 21 is a block diagram illustrating a communication apparatus according to an embodiment of the present invention.

FIG. 21 is a block diagram illustrating a communication apparatus in accordance with an embodiment of the present invention.

Referring to FIG. 21, a communication device 2100 includes a processor 2110, a memory 2120, an Radio Frequency (RF) module 2130, a display module 2140, and a user interface module 2150.

The communication device 2100 is illustrated for convenience of the description and some modules may be omitted. Moreover, the communication device 2100 may further include necessary modules. Some modules of the communication device 2100 may be further divided into sub-modules. The processor 2100 is configured to perform operations according to the embodiments of the present invention exemplarily described with reference to the figures. Specifically, for the detailed operations of the processor 2100, reference may be made to the contents described with reference to FIGS. 1 to 20.

The memory 2120 is connected to the processor 2110 and stores operating systems, applications, program code, data, and the like. The RF module 2130 is connected to the processor, 2110 and performs a function of converting a baseband signal into a radio signal or converting a radio signal into a baseband signal. For this, the RF module 2130 performs analog conversion, amplification, filtering, and frequency upconversion or inverse processes thereof. The display module 2140 is connected to the processor 2110 and displays various types of information. The display module 2140 may include, but is not limited to, a well-known element such as a Liquid Crystal Display (LCD), a Light Emitting Diode (LED), or an Organic Light Emitting Diode (OLED). The user interface module 2150 is connected to the processor 2110 and may include a combination of well-known user interfaces such as a keypad and a touchscreen.

The above-described embodiments are combinations of elements and features of the present invention in a predetermined manner. Each of the elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. In the appended claims, it will be apparent that claims that are not explicitly dependent on each other can be combined to provide an embodiment or new claims can be added through amendment after the application is filed.

The embodiments according to the present invention can be implemented by various means, for example, hardware, firmware, software, or combinations thereof. In the case of a hardware configuration, the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In the case of a firmware or software configuration, the method according to the embodiments of the present invention may be implemented by a type of a module, a procedure, or a function, which performs functions or operations described above. For example, software code may be stored in a memory unit and then may be executed by a processor. The memory unit may be located inside or outside the processor to transmit and receive data to and from the processor through various well-known means.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents and all changes coming within the meaning and equivalency range of the appended claims are intended to be embraced therein.

INDUSTRIAL APPLICABILITY

While the above-described method for changing a pattern of references signals according to rank variation in a wireless communication system, and the apparatus therefor have been described centering on an example applied to the 3GPP LTE system, the present invention is applicable to a variety of wireless communication systems in addition to the 3GPP LTE system.

The invention claimed is:

1. A method for transmitting a reference signal to a user equipment at a base station in a wireless communication system, the method comprising:
transmitting the reference signal to the user equipment according to a first pattern corresponding to a first rank; and
when a rank is changed from the first rank to a second rank, transmitting the reference signal to the user equipment according to a second pattern corresponding to the second rank,
wherein, when the second rank is greater than the first rank, the second pattern includes the first pattern, and
wherein a number of reference signal resources in a time domain for each spatial layer in the second pattern is larger than a number of reference signal resources in a time domain for each spatial layer in the first pattern.

2. The method according to claim 1, further comprising receiving information about a rank of a channel between the user equipment and the base station from the user equipment.

3. The method according to claim 1, further comprising receiving information about the second pattern from the user equipment, when the rank is changed from the first rank to the second rank.

4. The method according to claim 1, further comprising:
receiving an uplink sounding reference signal from the user equipment; and
estimating a rank of a downlink channel between the base station and the user equipment based on the uplink sounding reference signal.

5. The method according to claim 1, wherein the first pattern is a reference signal pattern for a single rank and the second pattern is defined as a hierarchical structure in which one or more reference signal symbols are added to the first pattern in a time domain direction.

6. The method according to claim 1, wherein time-domain reference signal density of the second pattern is higher than time-domain reference signal density of the first pattern.

7. A method for receiving a reference signal from a base station at a user equipment in a wireless communication system, the method comprising:
receiving the reference signal from the base station according to a first pattern corresponding to a first rank; and
when a rank is changed from the first rank to a second rank, receiving the reference signal from the base station according to a second pattern corresponding to the second rank,
wherein, when the second rank is greater than the first rank, the second pattern includes the first pattern, and
wherein a number of reference signal resources in a time domain for each spatial layer in the second pattern is larger than a number of reference signal resources in a time domain for each spatial layer in the first pattern.

8. The method according to claim 7, further comprising:
estimating a rank of a channel between the base station and the user equipment; and
transmitting information about the rank to the base station.

9. The method according to claim 7, further comprising:
estimating a rank of a channel between the base station and the user equipment; and
transmitting information about the second pattern to the base station, when the rank is changed from the first rank to the second rank.

10. The method according to claim 7, further comprising:
transmitting an uplink sounding reference signal to the base station,
wherein the base station estimates a rank of a downlink channel between the base station and the user equipment based on the uplink sounding reference signal.

11. The method according to claim 7, wherein the first pattern is a reference signal pattern for a single rank and the second pattern is defined as a hierarchical structure in which one or more reference signal symbols are added to the first pattern in a time domain direction.

12. The method according to claim 7, wherein time-domain reference signal density of the second pattern is higher than time-domain reference signal density of the first pattern.

13. A base station in a wireless communication system, the base station comprising:
a transmitter configured to transmit signals; and
a processor configured to:
control the transmitter to transmit a reference signal to a user equipment according to a first pattern corresponding to a first rank, and
control the transmitter to transmit the reference signal to the user equipment according to a second pattern corresponding to a second rank when a rank is changed to the second rank from the first rank,
wherein, when the if the second rank is greater than the first rank, the second pattern includes the first pattern, and
wherein a number of reference signal resources in a time domain for each spatial layer in the second pattern is larger than a number of reference signal resources in a time domain for each spatial layer in the first pattern.

14. A user equipment in a wireless communication system, the user equipment comprising:
a receiver configured to receive signals; and
a processor configured to:
control the receiver to receive a reference signal from a base station according to a first pattern corresponding to a first rank, and
control the receiver to receive the reference signal from the base station according to a second pattern corresponding to a second rank when a rank is changed to a second rank from the first rank,
wherein, when the second rank is greater than the first rank, the second pattern includes the first pattern, and
wherein a number of reference signal resources in a time domain for each spatial layer in the second pattern is larger than a number of reference signal resources in a time domain for each spatial layer in the first pattern.

* * * * *